United States Patent
Bye

(10) Patent No.: US 8,255,161 B2
(45) Date of Patent: Aug. 28, 2012

(54) SYSTEM AND METHOD OF AUTO-CALIBRATION OF INERTIAL SENSORS

(75) Inventor: Charles T. Bye, Eden Prairie, MN (US)

(73) Assignee: Honeywell International Inc., Morristown, NJ (US)

( * ) Notice: Subject to any disclaimer, the term of this patent is extended or adjusted under 35 U.S.C. 154(b) by 759 days.

(21) Appl. No.: 12/245,351

(22) Filed: Oct. 3, 2008

(65) Prior Publication Data
US 2010/0088027 A1     Apr. 8, 2010

(51) Int. Cl.
  *G01C 21/10* (2006.01)
(52) U.S. Cl. ....................... 701/510
(58) Field of Classification Search ............... 701/220, 701/300, 301, 213, 200, 207, 221, 510
See application file for complete search history.

(56) References Cited

U.S. PATENT DOCUMENTS

| | | | |
|---|---|---|---|
| 4,321,678 A * | 3/1982 | Krogmann | 701/220 |
| 4,740,085 A | 4/1988 | Lim | |
| 5,050,423 A | 9/1991 | Czarnocki | |
| 5,367,898 A | 11/1994 | Matsuzaki | |
| 5,617,317 A * | 4/1997 | Ignagni | 701/215 |
| 6,145,378 A * | 11/2000 | McRobbie et al. | 73/490 |
| 6,298,288 B1 * | 10/2001 | Li et al. | 701/13 |
| 6,374,191 B1 | 4/2002 | Tsuchiya et al. | |
| 6,459,990 B1 * | 10/2002 | McCall et al. | 701/220 |
| 6,480,152 B2 * | 11/2002 | Lin et al. | 342/357.32 |
| 6,615,117 B2 | 9/2003 | Li et al. | |
| 6,778,924 B2 | 8/2004 | Hanse | |
| 6,968,281 B2 | 11/2005 | Hanse | |
| 2002/0173910 A1 * | 11/2002 | McCall et al. | 701/220 |
| 2004/0073360 A1 * | 4/2004 | Foxlin | 701/207 |
| 2006/0025894 A1 * | 2/2006 | O'Connor et al. | 701/1 |

(Continued)

FOREIGN PATENT DOCUMENTS
WO    2008068542    6/2008

OTHER PUBLICATIONS
European Patent Office, "European Search Report", Feb. 4, 2011, Published in: EP.

(Continued)

*Primary Examiner* — James Trammell
*Assistant Examiner* — Truc M Do
(74) *Attorney, Agent, or Firm* — Fogg & Powers LLC

(57) ABSTRACT

A system comprises at least one inertial sensor operable to provide inertial sensor data during a trip; a processing unit coupled to the at least one inertial sensor, the processing unit operable to calculate navigation data based on the inertial sensor data and to estimate error in the inertial sensor data, wherein the processing unit is further operable to adjust subsequent inertial sensor data received during the trip from the at least one inertial sensor in order to compensate for the estimated error; and a memory coupled to the navigation unit and operable to store data between power cycles; wherein the processing unit is further operable to calculate a current trip error estimate from a plurality of error estimates during the trip and to estimate a repeatability error component based on the current trip error estimate and previous trip error estimates stored in the memory; wherein the repeatability error component is stored in the memory, the processing unit being further operable to update inertial sensor data during a subsequent trip based on the repeatability error component.

20 Claims, 3 Drawing Sheets

U.S. PATENT DOCUMENTS

2007/0032951 A1* 2/2007 Tanenhaus et al. ........... 701/220
2008/0091350 A1* 4/2008 Smith et al. .................. 701/213
2008/0223107 A1 9/2008 Stewart
2009/0089001 A1* 4/2009 Lin ................................ 702/92

OTHER PUBLICATIONS

Grewal, "Application of Kalman Filtering to the Calibration and Alignment of Inertial Navigation Systems", "Proceedings of the 29th Conference on Decision and Control", Dec. 1990, pp. 3325-3334, Publisher: IEEE, Published in: Honolulu, HI.

Kourepenis et al., "Performance of MEMS Inertial Sensors", "IEEE PLANS", Apr. 1998, pp. 1-8, Publisher: IEEE, Published in: Palm Springs, CA.

Stimac et al., "A Tactical Grade Depolarized Fiber Optic Gyroscope", "In Position Location and Navigation Symposium", 1994, pp. 182-185, Publisher: IEEE, Published in: Grand Rapids, MI.

* cited by examiner

SYSTEM AND METHOD OF AUTO-CALIBRATION OF INERTIAL SENSORS

BACKGROUND

Inertial sensors are used in many navigation systems to provide data to compute position, acceleration, heading, etc. Inertial sensors are subject to various sources of error. For example, two common errors are bias and scale factor. Bias and scale factor errors each have two components, a run-to-run (also referred to as repeatability) and an in-run (also referred to as stability) component. The repeatability component typically changes each time the system is powered on and off, but remains constant when the system is on. The stability component varies while the system is powered on.

Typical auto-calibration techniques do not provide an optimal implementation for some navigation systems, such as MEMS-based navigation systems. In some systems, such as MEMS, the stability component of the error may be the same or larger than the repeatability component. In these systems, when typical auto calibration techniques are used, the sensor error estimate that is stored in memory for use the next time the system is turned on will essentially be a random value due to the large size of the stability component of the sensor error. This makes the typical auto-calibration approach ineffective for some navigation systems.

SUMMARY

The above mentioned problems and other problems are resolved by the present invention and will be understood by reading and studying the following specification.

In one embodiment, a system is provided. The system comprises at least one inertial sensor operable to provide inertial sensor data during a trip; a processing unit coupled to at least one inertial sensor, the processing unit operable to calculate navigation data based on the inertial sensor data and to estimate error in the inertial sensor data, wherein the processing unit is further operable to adjust subsequent inertial sensor data received during the trip from at least one inertial sensor to compensate for the estimated error; and a memory coupled to the navigation unit and operable to store data between power cycles; wherein the processing unit is further operable to calculate a current trip error estimate from a plurality of error estimates during the trip and to estimate a repeatability error component based on the current trip error estimate and previous trip error estimates stored in the memory; wherein the repeatability error component is stored in the memory, the processing unit being further operable to update inertial sensor data during a subsequent trip based on the repeatability error component.

DRAWINGS

Understanding that the drawings depict only exemplary embodiments of the present invention and are not therefore to be considered limiting in scope, the exemplary embodiments will be described with additional specificity and detail through the use of the accompanying drawings, in which.

Figure 1:
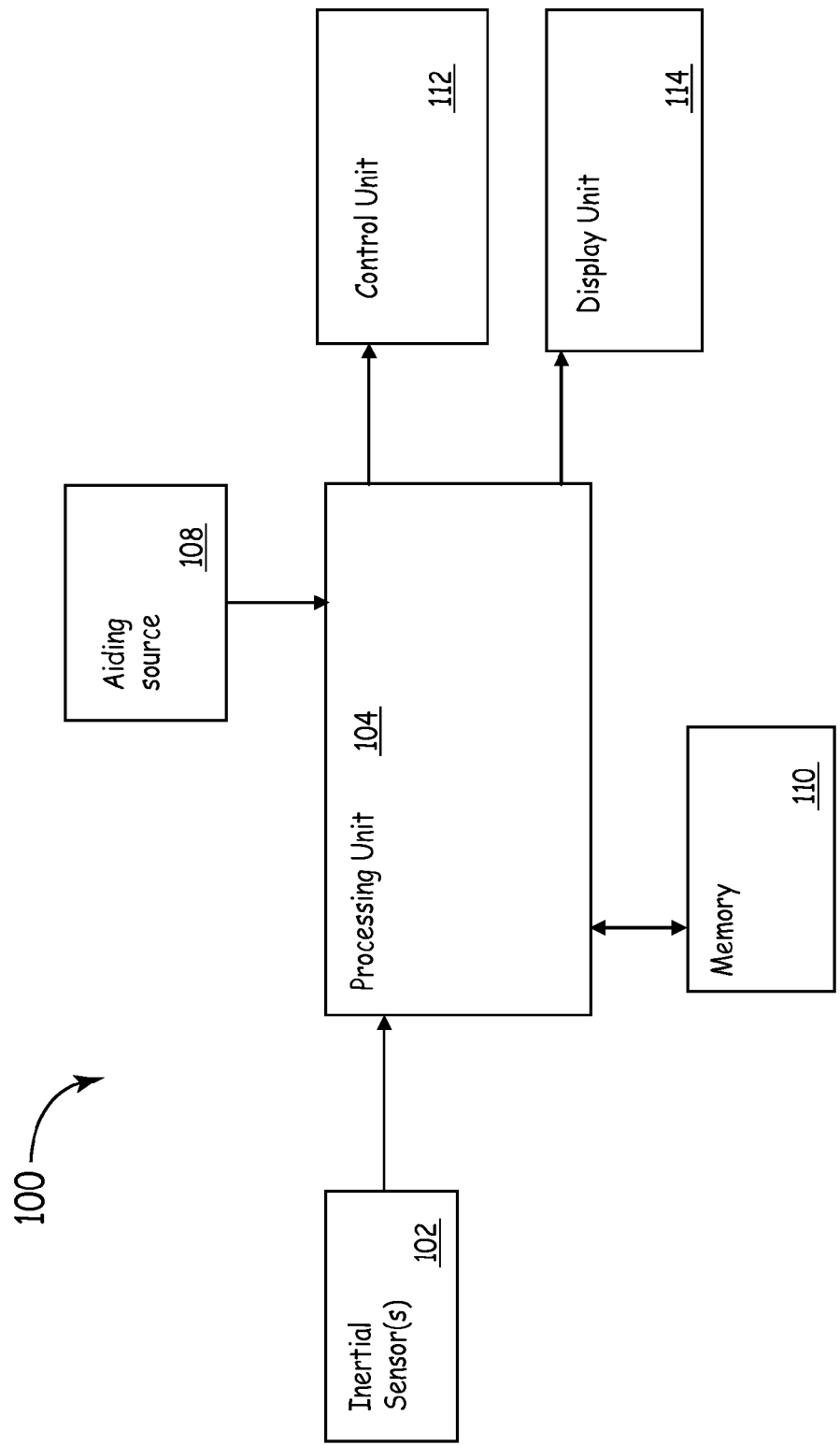
FIG. 1 is a block diagram of one embodiment of a navigation system.

In accordance with common practice, the various described features are not drawn to scale but are drawn to emphasize specific features relevant to the present invention.

DETAILED DESCRIPTION

In the following detailed description, reference is made to the accompanying drawings that form a part hereof, and in which is shown by way of illustration specific illustrative embodiments in which the invention may be practiced. These embodiments are described in sufficient detail to enable those skilled in the art to practice the invention, and it is to be understood that other embodiments may be utilized and that logical, mechanical, and electrical changes may be made without departing from the scope of the present invention. Furthermore, the method presented in the drawing figures or the specification is not to be construed as limiting the order in which the individual steps may be performed. The following detailed description is, therefore, not to be taken in a limiting sense.

In the embodiments described below, statistical techniques are used to separate the repeatability and stability components of estimated sensor errors. The repeatability component is then stored for use the next time the system is powered on. Hence, the embodiments described below provide an improved auto-calibration technique. For example, auto-calibration is improved for systems in which the stability component is significantly large relative to the repeatability component since the repeatability component is separated from and stored independently of the stability component.

FIG. 1 is a block diagram of one embodiment of a navigation system 100. Navigation system 100 is implemented in mobile vehicles such as, but not limited to, airplanes, helicopters, surface ships, automobiles, etc. Navigation system 100 includes at least one inertial sensor 102 operable to obtain inertial sensor data. For example, in one embodiment, inertial sensor 102 includes at least one linear accelerometer and at least one gyroscope. In addition, in some embodiments, inertial sensor(s) 102 are implemented as micro-electrical-mechanical system (MEMS) sensors. In other embodiments, inertial sensor(s) 102 are implemented as other sensor types, such as ring laser gyroscopes.

Inertial sensor(s) 102 output inertial sensor data to processing unit 104 during a trip. As used herein, the term "trip" refers to the time from when navigation system 100 is powered on until the navigation system 100 is powered off. Hence, a point during a trip refers to a point in time after navigation system 100 is powered on, but before navigation system 100 is powered off. Processing unit 104 uses the received inertial sensor data to calculate navigation data of the vehicle during the trip. In addition, processing unit 104 estimates the error in the calculated navigation data from a variety of sources including the inertial sensor. In particular, processing unit 104 is operable to estimate and store a run-to-run (repeatability) error component of the estimated error or errors in the inertial sensors, as discussed below.

In this embodiment, processing unit 104 implements a Kalman filter to estimate the bias and scale factor error of the inertial sensors in the calculated navigation data in a single Kalman filter state. The repeatability and stability components are together in a single state in this example. However, it is to be understood that, in other embodiments, other techniques are used to estimate the error in the calculated navigation data. Processing unit 104 uses data received from an aiding source 108 to estimate the error in the calculated navigation data. Aiding source 108 is implemented as a Global Positioning System (GPS) sensor in this embodiment. Hence, in this embodiment, the Kalman filter compares data received from GPS sensor 108 with the calculated navigation data to estimate the error. However, in other embodiments, aiding source 108 is implemented using different sensors and or techniques. For example, in other alternative embodiments, aiding source 108 is a sensor operable to independently determine when the vehicle has zero velocity (e.g. a sensor to determine when wheels on a ground vehicle are not rotating) or another radio based navigation system. Processing unit 104 is then able to determine which changes in the calculated navigation data are due to sensor errors rather than errors in the aiding source data.

Navigation unit 104 then adjusts subsequent inertial sensor data received from inertial sensor(s) 102 to compensate for the estimated error. In this way, navigation unit 104 periodically adjusts the received inertial sensor data with updated error estimates during the trip. One exemplary period for adjusting the received inertial sensor data is 1 Hz. In addition, navigation unit 104 calculates the covariance (i.e. uncertainty) of each estimated error and, in some embodiments, compares the covariance to a threshold value. For example, if the covariance of the estimated error exceeds the threshold value, the estimated error is discarded. If the covariance is equal to or below the threshold value, the estimated error is used in updating subsequent inertial sensor data received from inertial sensor(s) 102. For example, if the estimated error is approximately 50 part per million (ppm) and the covariance is above 400 ppm, the usefulness of the error estimate is limited. A threshold value for such a case could be set at 100 ppm to avoid using error estimates with relatively high levels of uncertainty in the estimate. The threshold level is based on the error characteristics of the inertial sensor(s).

Navigation unit 104 also calculates a trip error estimate. As used herein, a trip error estimate is an estimate of the error over a trip based on a plurality of error estimates taken at different points during the trip. In some embodiments, the trip error estimate is a statistically weighted average of a plurality of error estimates during the trip. For example, estimates with lower covariance are weighted more than estimates with higher covariance. Alternatively, the trip error estimate is calculated using a running average of the sensor error during the trip or using only a specified number of estimates (e.g. 10). As discussed above, in some embodiments, estimates having a covariance that exceeds the threshold value are not included in the trip average. Navigation unit 104 then stores the calculated trip error estimate (including the uncertainty of the trip error estimate) in memory 110.

Processing unit 104 uses the current trip error estimate together with previous trip error estimates stored in memory 110 to calculate an estimate of the repeatability component of the error estimates. In particular, in this embodiment, processing unit 104 uses a weighted least squares linear regression method to fit a curve to the current and previous trip error estimates. The fit curve is then used to estimate the repeatability component at the present time. This value is stored in memory 110 along with its associated uncertainty.

The repeatability component is calculated using the estimates from all previous trips in some embodiments. In other embodiments, a moving window of previous trip error estimates is used. In other words, only a specific number of the most recent trip error estimates are used. For example, only the previous 10 trip error estimates are used in some embodiments. The oldest trip error estimate is deleted when a new trip estimate is computed since the moving window only includes the 10 most recent previous trip error estimates.

The repeatability component is used during subsequent trips in adjusting inertial sensor data. For example, at the start of the next trip (i.e. at power on), the repeatability component is retrieved from memory 110 and used in adjusting inertial sensor data received from inertial sensor(s) 102. For example, during startup when no in-run estimates have been calculated by processing unit 104, the repeatability component is used to adjust for error in the initial sensor data from inertial sensor(s) 102. After startup, the inertial sensor data from inertial sensor(s) 102 is updated with the error estimates calculated by processing unit 104.

Processing unit 104 outputs the calculated navigation data to at least one of display element 112 and control unit 114, in some embodiments. Display element 112 enables a user to view the calculated navigation data while controlling the vehicle. Suitable display elements include, but are not limited to, various cathode ray tube (CRT), active and passive matrix liquid crystal display (LCD), and plasma display systems. Control unit 114 is used to perform additional control functions based on the navigation data, such as, but not limited to, changing engine throttle, changing heading of the vehicle, etc.

Figure 2:
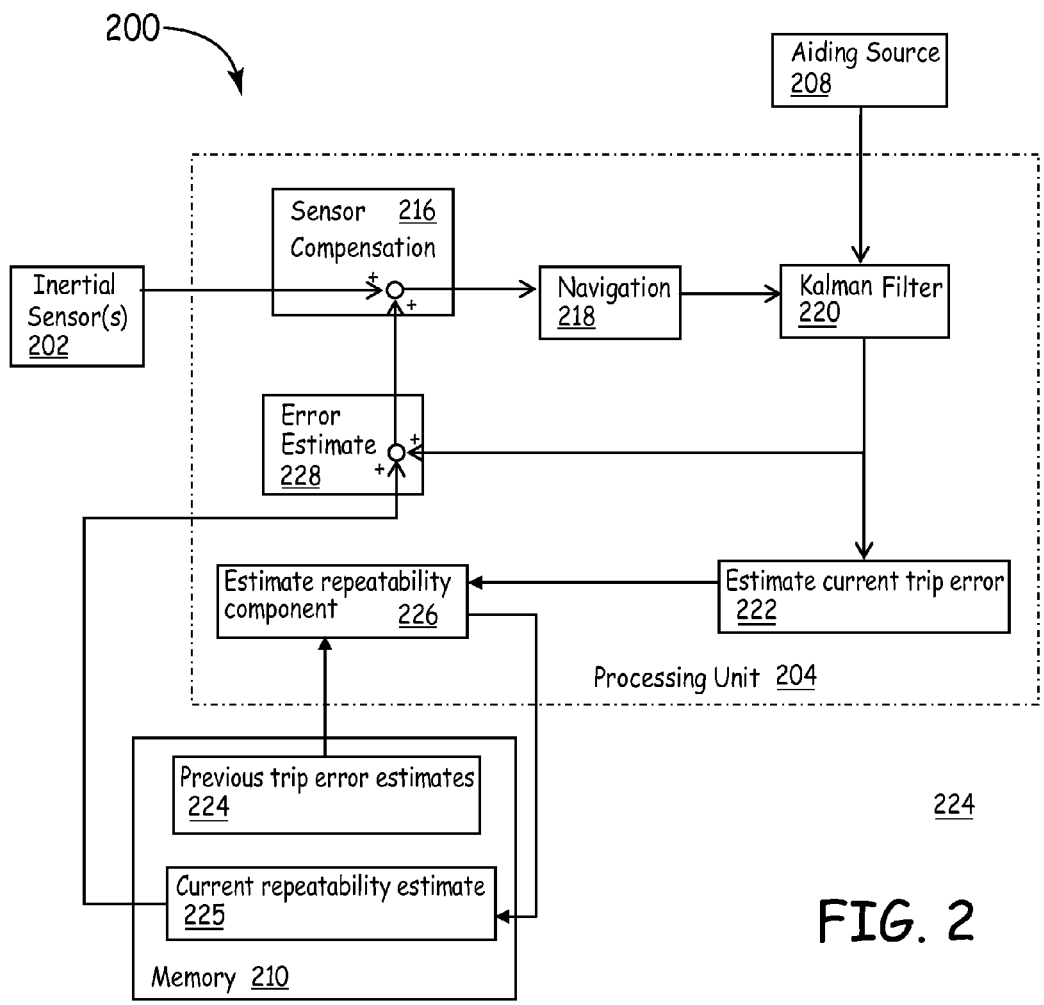
FIG. 2 is a data flow diagram depicting one embodiment of the flow of data in a navigation system.

FIG. 2 is a data flow diagram depicting one embodiment of the flow of data in a navigation system such as navigation system 100 above. Sensor data flows from sensors 202 to processing unit 204. In particular, the sensor data is adjusted in sensor compensation block 216 if an error estimate is available. The compensated data is then used to calculate navigation data in navigation block 218. The navigation data is then passed to Kalman filter 220. In addition, aiding information from aiding source 208 flows into Kalman filter 220. Kalman filter 220 estimates an error in the navigation data based on the aiding information. The estimated error is combined with a current repeatability component, when available, in error estimate block 228. The updated error estimate from error estimate block 228 is passed to sensor compensation block 216 to compensate subsequent data from sensors 202. The error estimate from Kalman filter 220 is periodically passed to error estimate block 228 during a trip. For example, in one embodiment, the period is 1 Hz.

In addition, the error estimate from Kalman filter 220 is passed to block 222 where processing unit 204 calculates a current trip error. The trip error is an estimate of the error in the navigation data over the course of a trip. The trip error estimate is a weighted average, in some embodiments, as discussed above. In some embodiments, the error estimate from Kalman filter 220 is only passed to block 222 if the covariance of the error estimate is below a threshold as discussed above. The current trip error estimate is saved with previous trip error estimates 224 in memory 210. The current trip error estimate is passed to block 226 where processing unit 204 estimates a repeatability component. In addition, processing unit 204 retrieves previous trip error estimates from block 224 of memory 210 to be used with the current trip error estimate in estimating the current repeatability component. In particular, a repeatability component is estimated for one or more of gyroscope scale factor, gyroscope bias, linear accelerometer bias and linear accelerometer scale factor error. The repeatability component is estimated, in some embodiments, by using a weighted least squares linear regression method as discussed above. The current repeatability component estimate is stored in block 225 of memory 210. Once during each trip, such as at startup, the current estimated repeatability component is passed to error estimate block 228 to be used for compensating sensor data at startup.

Figure 3:
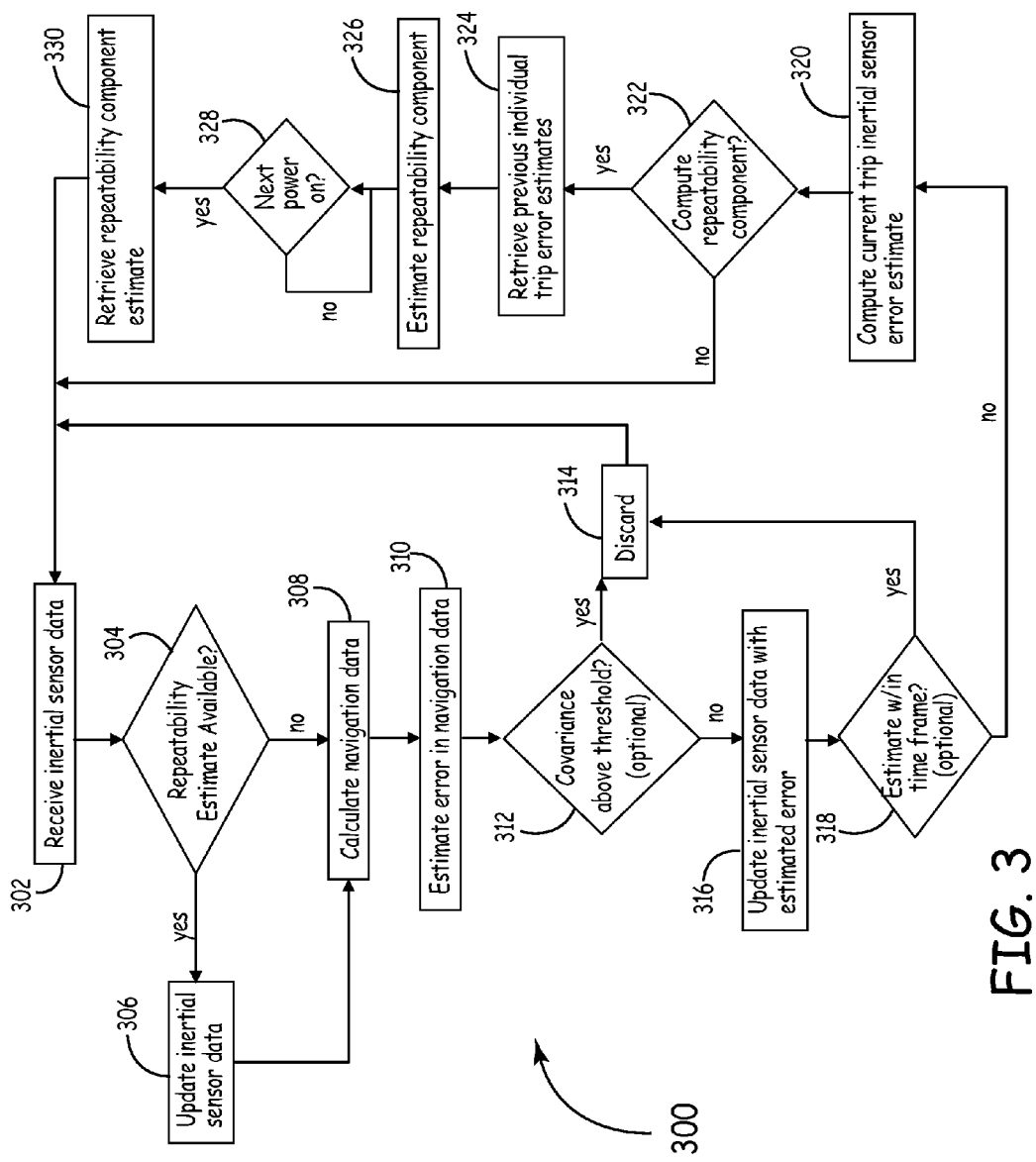
FIG. 3 is a flow chart depicting one embodiment of a method of auto-calibration of inertial sensor errors.

FIG. 3 is a flow chart showing one embodiment of a method 300 of calibrating inertial sensor(s) 102 as described above. In addition, method 300 can be implemented as processor-readable instructions operable to cause a processor to calibrate inertial sensor data. Instructions are typically tangibly embodied on any appropriate medium used for storage of computer readable instructions or data structures. Computer readable media can be any available media that can be accessed by a general purpose or special purpose computer or processor, or any programmable logic device. Suitable computer readable media may include storage media or memory media such as magnetic or optical media, e.g., disk or CD-ROM, volatile or non-volatile media such as RAM (e.g. SDRAM, DDR SDRAM, RDRAM, SRAM, etc.), ROM, EEPROM, flash memory, etc. as well as transmission media or signals such as electrical, electromagnetic, or digital signals, conveyed via a communication medium such as network and/or a wireless link.

At 302, inertial sensor data is received from at least one inertial sensor. At 304, it is determined if a repeatability error component estimate is available. For example, if no previous trips have been taken, a repeatability error component may not be available during startup of the current trip. If a repeatability error component is available, the received sensor data is updated at 306 using the repeatability error component. If no repeatability error component is available, navigation data is calculated based on the inertial sensor data at 308. At 310, the inertial sensor error, and its covariance are estimated. For example, in some embodiments, position data from an aiding device is used to estimate the error in the navigation solutions calculated position data and the contribution of this position due to the errors in the inertial sensors, as described above. In some embodiments both sensor bias and scale factor error are estimated. In addition, in some embodiments, the error is estimated for both a linear accelerometer and a gyroscope.

At 312, it is optionally determined if the covariance of the estimated error exceeds a threshold value. As described above, the usefulness of the estimated error can be limited when the uncertainty in the error is large compared to the expected sensor error. The expected error is based on the capability of the inertial sensors. In such situations, a threshold can be used. If the error estimate is above the threshold, the error estimate is discarded at 314. Otherwise, method 300 continues at 316, where subsequent sensor data is updated. At 318, it is optionally determined if an error estimate has been calculated within a set time frame, such as the previous 10 minutes. If an error estimate has been calculated within the set time frame, the error estimate is discarded at 314. The set time frame is used to ensure a trip error estimate is calculated based on error estimates obtained throughout the trip.

At 320, a current trip error estimate is calculated if no error estimate has been calculated within the set time frame at 318. In some embodiments, the current trip error estimate is a weighted average of error estimates calculated during the trip. The current trip error estimate is calculated as a running average during the trip in some embodiments. Alternatively, the trip error estimate can be calculated once at the end of the trip and/or after a set number of error estimates are obtained. At 322, it is determined if a repeatability component should be computed. For example, the repeatability component is only calculated at the end of a trip, in some embodiments. In other embodiments, the repeatability component is calculated after a set number of trips (e.g. 10 trips). If a repeatability component is not to be calculated, method 300 returns to 302. If a repeatability component is to be calculated (e.g. at the end of the trip prior to power off), previous trip error estimates are retrieved from a memory at 324.

At 326, the repeatability component is estimated based on the current and previous trip error estimates. In particular, in some embodiments, a moving window of previous trip error estimates is used. In other words, only the most recent previous trip error estimates are used. For example, in one embodiment, only the 10 most recent trip error estimates are included in the calculation of the repeatability component. For example, in some embodiments, a weighted least squares linear regression method is used to fit a curve to the current and previous trip error estimates. The least squares linear regression calculation is weighted based on the covariance of each trip error estimate. The curve is used to determine the repeatability component at the present time. The repeatability component of the sensor error(s) is stored for future use.

At 328, it is determined if a subsequent trip is beginning based on a new power on. If the vehicle is beginning a subsequent trip, the repeatability component is retrieved from the memory at 330. The repeatability component is then used at 306, in adjusting sensor data received at 302. The repeatability component is only retrieved once during the startup of the subsequent trip. Additional adjustments are then based on new error estimates taken during the trip as described above.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof

What is claimed is:

1. A system comprising:
   at least one inertial sensor configured to provide inertial sensor data during a trip;
   a processing unit coupled to the at least one inertial sensor, the processing unit configured to calculate navigation data based on the inertial sensor data and to estimate error in the inertial sensor data, wherein the processing unit is further configured to adjust subsequent inertial sensor data received during the trip from the at least one inertial sensor to compensate for the estimated error; and
   a memory coupled to the processing unit and configured to store data between power cycles;
   wherein the processing unit is further configured to calculate a current trip error estimate from a plurality of error estimates during the trip and to estimate a repeatability error component based on the current trip error estimate and previous trip error estimates stored in the memory;
   wherein the repeatability error component is stored in the memory, the processing unit being further configured to update inertial sensor data during a subsequent trip based on the repeatability error component.

2. The system of claim 1, further comprising:
   an aiding source coupled to the processing unit and configured to provide navigation data;
   wherein the processing unit is configured to use the navigation data provided by the aiding source to estimate the error in the navigation data.

3. The system of claim 2, wherein the aiding source is a Global Positioning System (GPS) receiver.

4. The system of claim 1, wherein the processing unit is configured to estimate the error using a Kalman filter.

5. The system of claim 1, wherein the at least one inertial sensor comprises at least one linear accelerometer and at least one gyroscope.

6. The system of claim 1, wherein the at least one inertial sensor comprises a micro-electrical-mechanical system (MEMS) sensor.

7. The system of claim 1, wherein the processing unit is configured to estimate bias error and scale factor error.

8. The system of claim 1, wherein the processing unit is configured to calculate a statistically weighted trip error estimate based on the covariance of each of the plurality of error estimates during the trip.

9. The system of claim 1, wherein the processing unit is configured to compare the covariance of each error estimate with a threshold value, wherein error estimates having a covariance above the threshold value are discarded and error estimates having a covariance below the threshold are used to adjust subsequent inertial sensor data.

10. The system of claim 1, wherein the processing unit is configured to estimate a repeatability error component based on the current trip error estimate and a moving window of previous trip error estimates.

11. A method of calibrating an inertial sensor, the method comprising:
    receiving, in a processing unit, inertial sensor data from the inertial sensor;
    calculating navigation data in the processing unit based on the received inertial sensor data;
    estimating error in the calculated navigation data with the processing unit;
    adjusting subsequent received inertial sensor data, with the processing unit, to compensate for estimated errors;
    calculating a trip error estimate, in the processing unit, from a plurality of error estimates during a trip;
    estimating a repeatability error component, in the processing unit, based on the current trip error estimate and previous trip error estimates;
    storing the repeatability error component in a memory; and
    adjusting inertial sensor data during a subsequent trip, with the processing unit, based, at least in part, on the repeatability error component.

12. The method of claim 11, wherein estimating error in the calculated navigation data comprises estimating error in the calculated navigation data based on navigation data provided by an aiding source.

13. The method of claim 11, wherein estimating error in the calculated navigation data comprises estimating bias error and scale factor error.

14. The method of claim 11, wherein adjusting subsequent received inertial sensor data to compensate for estimated errors comprises:
    comparing the covariance of each estimated error with a threshold value;
    discarding estimated errors having a covariance above the threshold value; and
    adjusting subsequent received inertial sensor data with estimated errors having a covariance equal to or below the threshold value.

15. The method of claim 11, wherein calculating a trip error estimate from a plurality of error estimates during the trip comprises calculating a weighted average of the plurality of error estimates based on the covariance of each of the plurality of error estimates.

16. The method of claim 11, wherein estimating a repeatability error component comprises estimating a repeatability error component based on the current trip error estimate and a moving window of previous trip error estimates.

17. A program product comprising program instructions embodied on a non-transitory processor-readable medium for execution by a programmable processor, wherein the program instructions are configured to cause the programmable processor to:
    calculate navigation data based on inertial sensor data received from at least one inertial sensor;
    estimate error in the calculated navigation data based on navigation data received from an aiding source;
    adjust subsequent received inertial sensor data to compensate for estimated errors;
    calculate a trip error estimate from a plurality of error estimates during a trip;
    retrieve a plurality of previous trip error estimates from a memory device;
    estimate a repeatability error component based on the calculated trip error estimate and the plurality of previous trip error estimates;
    store the repeatability error component in the memory device; and
    adjust inertial sensor data during a subsequent trip based, at least in part, on the repeatability error component.

18. The program product of claim 17, wherein the program instructions are further configured to cause the programmable processor to retrieve only a set number of the most recent previous trip error estimates from the memory device to use in estimating the repeatability error component.

19. The program product of claim 17, wherein the program instructions are further configured to cause the programmable processor to estimate both bias error and scale factor error in the inertial sensor data.

20. The program product of claim 17, wherein the program instructions are further configured to cause the programmable processor to:
    compare each estimated error's covariance with a threshold value;
    discard estimated errors having a covariance above the threshold value; and adjust subsequent received inertial sensor data with estimated errors having a covariance equal to or below the threshold value.

* * * * *